(12) United States Patent
Oh et al.

(10) Patent No.: US 9,868,373 B2
(45) Date of Patent: Jan. 16, 2018

(54) SEAT WITH WARMER

(71) Applicant: Hyundai Motor Company, Seoul (KR)

(72) Inventors: Man Ju Oh, Whasung-Si (KR); Jae Woo Park, Whasung-Si (KR); Jae Woong Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/943,322

(22) Filed: Nov. 17, 2015

(65) Prior Publication Data

US 2017/0072821 A1    Mar. 16, 2017

(30) Foreign Application Priority Data

Sep. 10, 2015    (KR) .................. 10-2015-0128612

(51) Int. Cl.
*B60N 2/56*    (2006.01)
*B60H 1/00*    (2006.01)

(52) U.S. Cl.
CPC ........... *B60N 2/565* (2013.01); *B60N 2/5635* (2013.01); *B60N 2/5657* (2013.01); *B60H 2001/00214* (2013.01); *B60H 2001/00242* (2013.01)

(58) Field of Classification Search
CPC ...... B60N 2/5621; B60N 2/56; B60N 2/5635; B60N 2/5657; B60N 2/565; A47C 7/74; B60H 1/0025; B60H 1/0055; B60H 1/00285; B60H 2001/00214; B60H 2001/00242
USPC .......................... 297/180.14, 180.13, 180.12
See application file for complete search history.

(56) References Cited

U.S. PATENT DOCUMENTS

2013/0140857 A1    6/2013    Shin et al.

FOREIGN PATENT DOCUMENTS

| FR | 2 691 344 (A1) | 11/1993 |
|---|---|---|
| JP | 4-39119 A | 2/1992 |
| JP | 7-246131 A | 9/1995 |
| JP | 5488606 B2 | 3/2014 |
| KR | 10-2009-0111498 A | 10/2009 |
| KR | 10-1509407 B1 | 3/2015 |
| WO | WO 2009/117988 (A1) | 10/2009 |
| WO | WO 2011036860 A1 | 3/2011 |

*Primary Examiner* — Milton Nelson, Jr.
(74) *Attorney, Agent, or Firm* — Morgan, Lewis & Bockius LLP

(57) ABSTRACT

A seat with a warmer may include a heating unit mounted on a rear side of a seat back and radiating heat toward a rear seat; an air duct disposed close to the heating unit on the seat back, extending up and down on the seat back, and passing air therein, and a blowing unit disposed in the air duct generating a sucking force in the air duct so that air heated by the heating unit flows into the air duct, and sending out the heated air in the air duct to a floor under the rear seat.

5 Claims, 7 Drawing Sheets

SEAT WITH WARMER

CROSS REFERENCE TO RELATED APPLICATION

The present application claims priority to Korean Patent Application No. 10-2015-0128612, filed Sep. 10, 2015, the entire contents of which is incorporated herein for all purposes by this reference.

BACKGROUND OF THE INVENTION

Field of the Invention

The present invention relates to a seat with a warmer that makes a passenger comfortable by providing heat to the passenger and warm air even to the feet of the passenger.

Description of Related Art

Vehicles are generally equipped with HVAC (Heating Ventilating Air Conditioning) to make the interiors thereof pleasant.

For example, an automotive HVAC includes: a heater generating heat; an evaporator generating cold air; a blower supplying hot/cold air, a distribution duct distributing cold air and warm air from the blower; an air duct connected to the distribution duct and extending along both sides inside a vehicle and a side duct connected to the air duct; a center duct connected to the distribution duct and disposed at the center between front seats; and a rear heating duct connected to the distribution duct and extending along the bottom under rear seats and a rear duct connected to the rear heating duct.

An automotive HVAC includes a center duct at the center of a panel, and a side vent and a side duct at both sides to provide comfort to passengers in the front seats and includes a rear heating duct and a rear duct under the rear seats to provide comfort to the passengers in the rear seats.

Accordingly, the passengers in the front seats are comforted by cold air, warm air, and moisture supplied to their chests, in addition to cold air, warm air, and moisture supplied under the front seats, while the passengers in the rear seats are comforted by only cold air, warm air, and moisture supplied under the rear seats.

As a result, the passengers in rear seats feel as comfortable as the passengers in the front seat when considerable time has passed after the HVAC is operated, so the passengers in the rear seats feel less comfortable in comparison to the passengers in the front seat in summer or winter.

In particular, vehicles that are designed to address convenience of passengers in the rear seats are designed to quickly provide a pleasant environment to the passengers in the rear seats by more quickly supplying cold air in summer or warm air in winter to the passengers in the rear seats.

Further, when although warm air is supplied to the upper body of passengers in the rear seats, warm air is not supplied to the lower body and the feet, thus the passengers may keep feeling cold.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a seat with a warmer that makes a passenger comfortable by providing heat to the passenger and warm air even to the feet of the passenger.

Accordingly, various aspects of the present invention are directed to providing a seat with a warmer that includes: a heating unit mounted on a rear side of a seat back and radiating heat toward a rear seat; an air duct disposed close to the heating unit on the seat back, extending up and down on the seat back, and passing air therein; and a blowing unit disposed in the air duct generating a sucking force in the air duct so that air heated by the heating unit flows into the air duct, and sending out the heated air in the air duct to the floor under the rear seat.

The heating unit may be formed to have a predetermined area smaller than an area of the rear side of the seat back such that high-temperature heat is discharged through the predetermined area.

An insulator preventing heat from the heating unit from transferring to the seat back may be disposed between the rear side of the seat back and the heating unit.

An isolating layer covering the heating unit to prevent direct contact with the heating unit may be disposed on the rear side of the seat back.

A collector fixed to a top of the heating unit, extending laterally as long as a width of the heating unit, protruding rearward and then bending down, and collecting the heat radiated from the heating unit may be disposed on the seat back.

The air duct may include a horizontal duct horizontally extending over the heating unit and a vertical duct extending downward from the horizontal duct, and the blowing unit may be disposed at a lower end of the vertical duct.

Air intake holes may be formed through a bottom of the horizontal duct of the air duct and the vertical duct may be disposed across a center of the heating unit from a center of the horizontal duct.

The horizontal duct of the air duct may be symmetrically divided into two parts at left and right sides from a center of the heating unit and may have air intake holes formed through a bottom of the horizontal duct, while the vertical ducts may be connected to the divided horizontal ducts, respectively, and disposed symmetrically at both sides of the heating unit.

The air duct may be vertically extends across a center of the heating unit and may have air intake holes at both sides and the blowing unit may be disposed at a lower end of the air duct.

A plurality of air ducts may extend vertically and symmetrically at both sides of the heating unit, air intake holes may be formed at sides facing each other of the air ducts, and the blowing unit may be disposed at lower ends of the air ducts.

The blowing unit may be disposed at the lowest end of the air duct so that heated air flowing in the air duct is discharged to the floor under the rear seat.

According to the seats with a warmer having the structures described above, heat is transmitted to the upper and lower body of a passenger by the heat radiated from the heating unit and the air heated by the heating unit is also sent to the feet of the passenger, thus providing a passenger with a comfortable climate.

Therefore, as warm air is supplied to the passenger's entire body, the passenger can more quickly feel comfortable in winter.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
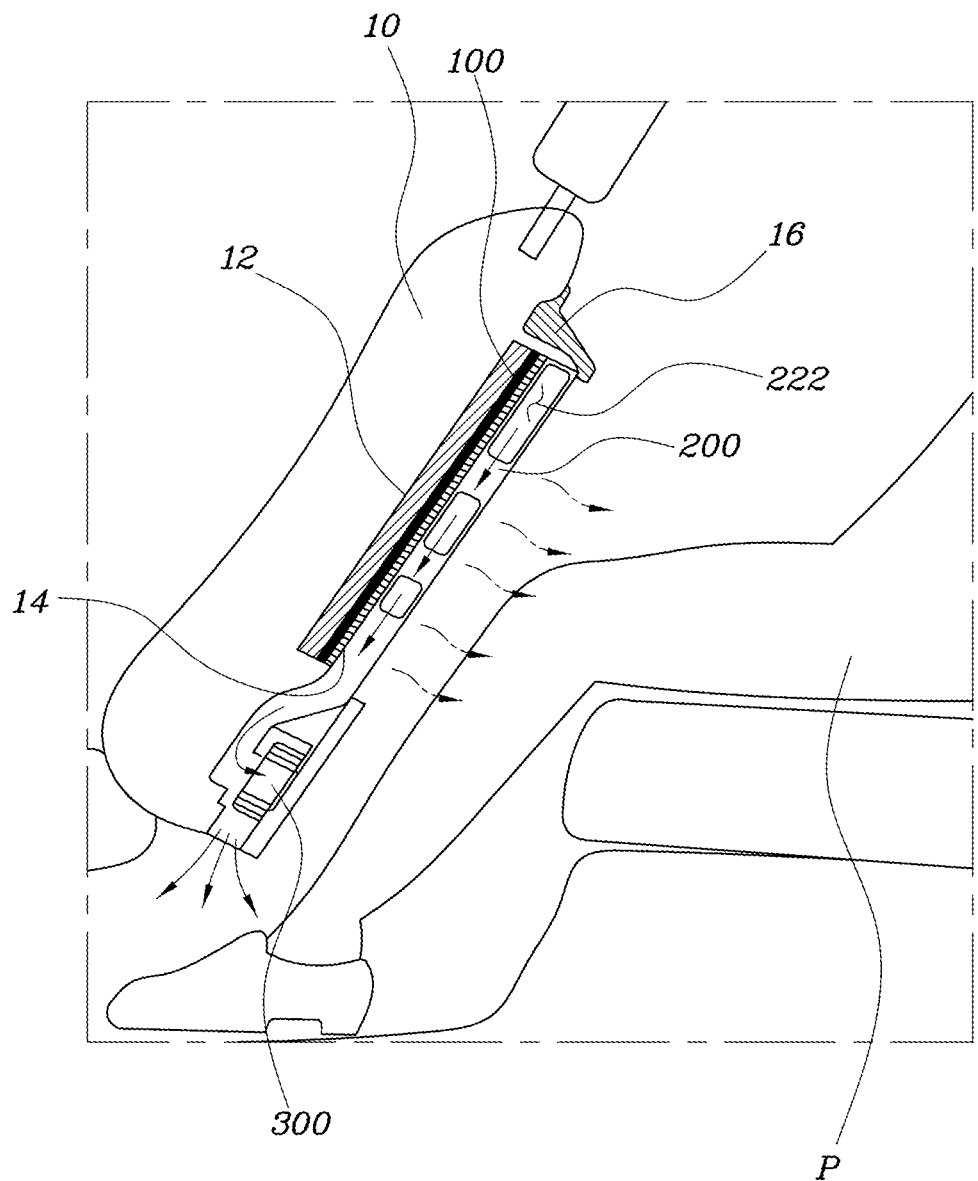
FIGS. 1 and 2 are views showing a seat with a warmer according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, seats with a warmer according to embodiments of the present invention will be described hereafter with reference to the accompanying drawings.

Figure 2:
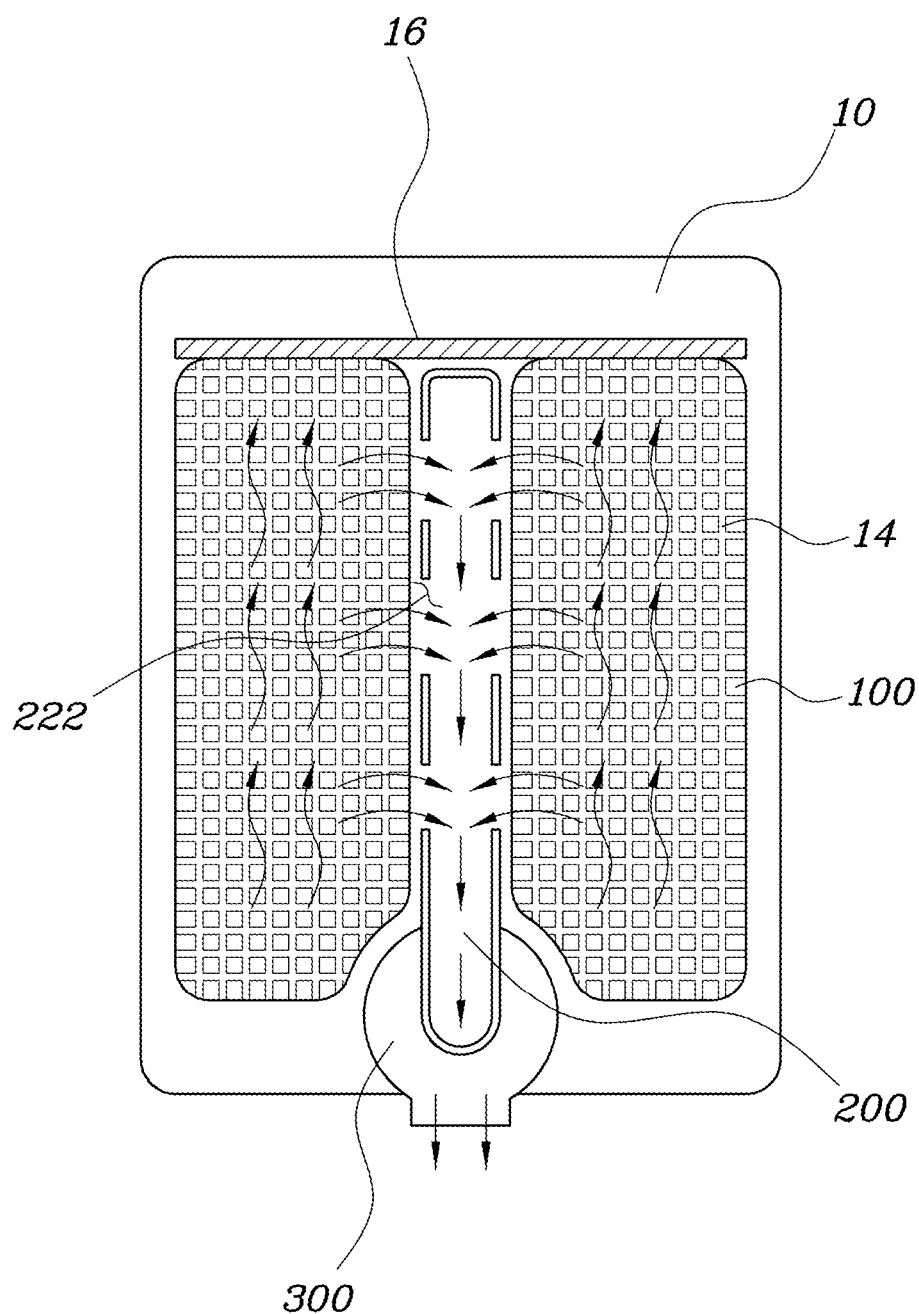

FIGS. 1 and 2 are views showing a seat with a warmer according to an embodiment of the present invention and FIGS. 3 to 7 are views showing seats with a warmer according to various embodiments of the present invention.

A seat with a warmer according to an embodiment of the present invention, as shown in FIGS. 1 and 2, includes: a heating unit 100 mounted on the rear side of a front seat back 10 and radiating heat toward a rear seat; an air duct 200 disposed close to the heating unit 100 on the seat back 10, extending up and down on the seat back 10, and passing air therein; and a blowing unit 300 disposed in the air duct 200 generating a sucking force in the air duct 200 so that air heated by the heating unit 100 flows into the air duct 200, and sending out the heated air in the air duct 200 to the floor under the rear seat.

The blower 300 is disposed at the lower end of the air duct 200 to send out the heated air in the air duct 200 to the floor under the rear seat and it may be a blower.

As described above, the seat with a warmer according to an embodiment of the present invention includes the heating unit 100, the air duct 200 through which the air heated by the heating unit 100 flows, and the blowing unit 300 discharging the heated air in the air duct 200, and these components are disposed on the rear side of a front seat back 10 to supply warm air to the passenger P in the rear seat. The warmer not only can be mounted on a seat, but may also be mounted on a dash panel, so it may supply warm air to a passenger P in a front seat.

That is, the seat with a warmer supplies warm air to the upper body and the lower body of a passenger P in a rear seat, using the heating unit 100 mounted on the rear side of the front seat back 10 and radiating heat to the rear seat. The heating unit 100 may be a plane heater and may be a heater radiating far infrared rays.

The seat with a warmer supplies warm air not only to the upper and lower bodies of the passenger P but also to the feet to provide comfort to the passenger. To this end, the air duct 200 passing air therein is disposed close to the heating unit 100 on the front seat back 10 and the blowing unit 300 is disposed at the lower end of the air duct 200 so that the air heated by the heating unit 100 flows into the air duct 200 and is then discharged to the feet of the passenger P in the rear seat.

Accordingly, warm air is supplied to the upper and lower body by the heat radiated from the heating unit 100 and warm air is supplied to the feet too, so warm air is supplied to the entire body of the passenger P in the rear seat.

In detail, according to the seat with a warmer, the heating unit 100 may be formed to have a predetermined area smaller than the area of the rear side of the seat back 10 such that high-temperature heat is discharged through the area.

As described above, the heat unit 100, a device for generating heat throughout its area, may be a plane heater or a heater radiating far infrared rays, and by providing the heating unit 100 in a predetermined area, it is possible to efficiently supply warm air to the passenger P and quickly increase the temperature of the air around the heating unit as well. Accordingly, the temperature of the air supplied from the air duct 200 to the feet of the passenger P in the rear seat is sufficiently raised, so warm air can be supplied to the entire body of the passenger P in the rear seat.

An insulator 12 that prevents heat from the heating unit 100 from transferring to the seat back 10 may be disposed between the rear side of the seat back 10 and the heating unit 100.

As the insulator 12 is disposed between the rear side of the seat back 10 and the heating unit 100, it is possible to prevent high-temperature heat generated by the heating unit 100 from transferring to the passenger P in the front seat directly through the seat back 10. Further, it is possible to prevent the backboard of the seat back 10 from being melted or damaged due to the high-temperature heat generated by the heating unit 100.

On the other hand, an isolating layer 14 covering the heating unit 100 to prevent direct contact with the heating unit 100 may be disposed on the rear side of the seat back 10.

Since the isolating layer 14 covering the heating unit 100 is disposed on the seat back, it is possible to prevent the passenger P in the rear seat from coming in direct contact with the heating unit 100. The isolating layer 14 may be formed in the shape of a net and may be made of a material with low thermal conductivity.

Further, a collector 16 fixed to the top of the heating unit 100, extending laterally as long as the width of the heating unit 100, protruding rearward and then bending down, and collecting the heat radiated from the heating unit 100 may be disposed on the seat back 10.

That is, the collector 16 is fixed to the top of the heating unit 100, and protrudes rearward and then bends down, so that the air heated by the heat radiated from the heating unit 100 is not dissipated upward, but is collected by the collector 16. The heated air collected by the collector 16, as described above, is sent to the feet of the passenger P in the rear seat through the air duct 200, so thermal efficiency can be improved.

The seat back 10 may be damaged by the high-temperature heat generated by the heating unit 100 and intensively applied to the upper portion of the seat back 10, but the collector 16 is disposed on the top of the heating unit 100 and blocks the high-temperature heat from the heating unit 100, so the seat back 10 is not damaged by the heat.

The air duct 200 through which the air heated by the heating unit 100 flows is described hereafter through various embodiments.

The air duct 200 may include a horizontal duct 220 horizontally extending over the heating unit 100 and a vertical duct 240 extending downward from the horizontal duct 220, and the blowing unit 300 may be disposed at the lower end of the vertical duct 240. That is, the air duct 200 may include the horizontal duct 220 that sucks and collects the air heated by the heating unit 100 and the vertical duct 240 extending such that the air sucked into the horizontal duct is sent to the floor under the rear seat. Since the blowing duct 300 is disposed at the lower end of the vertical duct 240, when the blowing unit 300 is operated, a sucking force is generated in the air duct 200, so the air heated by the heating unit 100 flows into the horizontal duct 220 and the vertical duct 240 and then is discharged to the feet of the passenger P in the rear seat through the lower end of the vertical duct 240.

Figure 3:
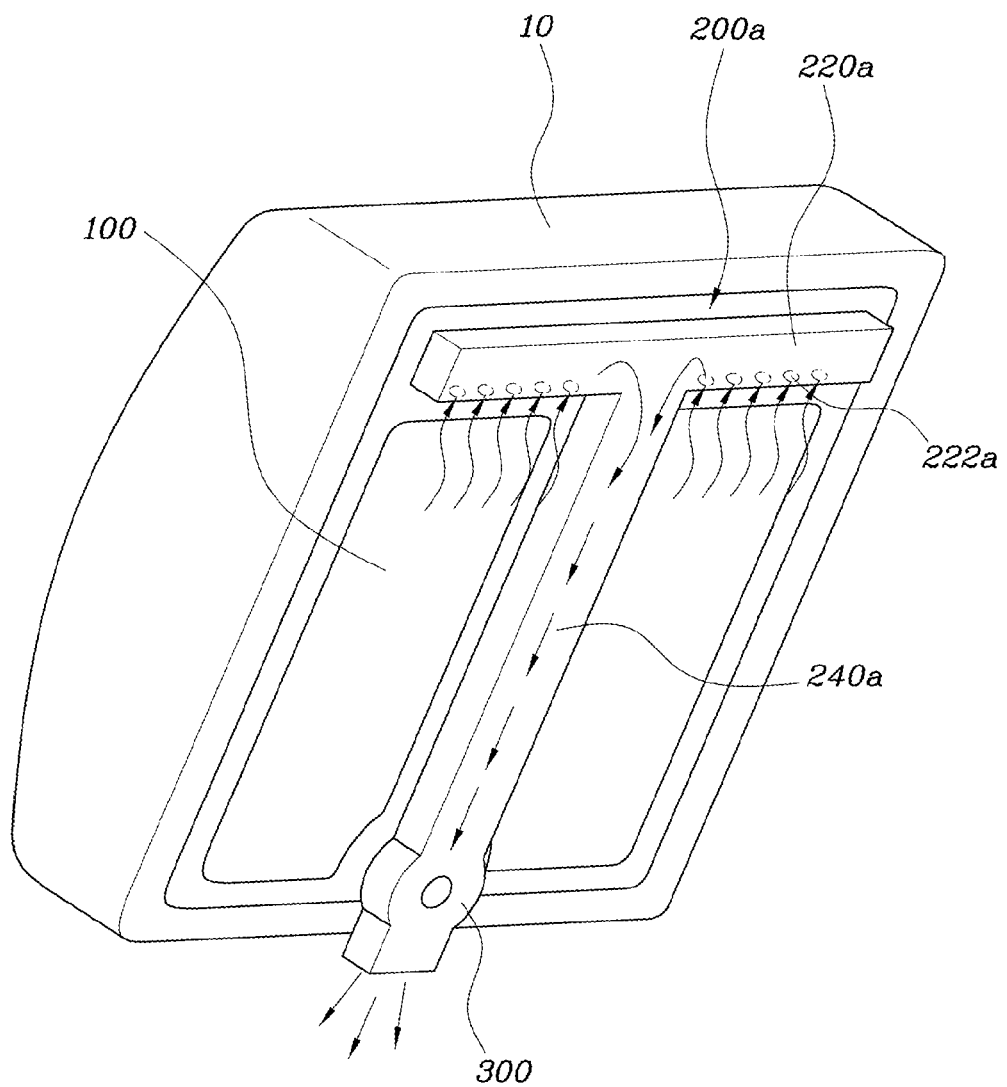
FIGS. 3 to 7 are views showing seats with a warmer according to various embodiments of the present invention.

As a first embodiment, as shown in FIG. 3, air intake holes 222a may be formed through the bottom of a horizontal duct 220a of an air duct 200a and a vertical duct 240a may be disposed across the center of the heating unit 100 from the center of the horizontal duct 220a.

That is, the horizontal duct 220a is disposed over the top of the heating unit 100 and the air intake holes 222a are formed through the bottom of the horizontal duct 220a. Accordingly, the air heated by the heating unit 100 can be collected by the horizontal duct 220a and flow through the air intake holes 222a of the horizontal duct 220a. Since the vertical duct 240a is connected to the center of the horizontal duct 220a across the heating unit 100 and the blowing unit 300 is disposed at the lower end of the vertical duct 240a, when the blowing unit 300 is operated, the heated air flowing inside through the air intake hole 222a of the horizontal duct 220a over the heating unit 100 flows down through the vertical duct 240 and is then sent out to the feet of the passenger P in the rear seat. Accordingly, the passenger P can feel warmth on his/her upper and lower body by the heating unit 100, and the air heated by the heating unit 100 is sent to the feet of the passenger P, so the passenger P can feel warmth throughout his/her body.

Figure 4:
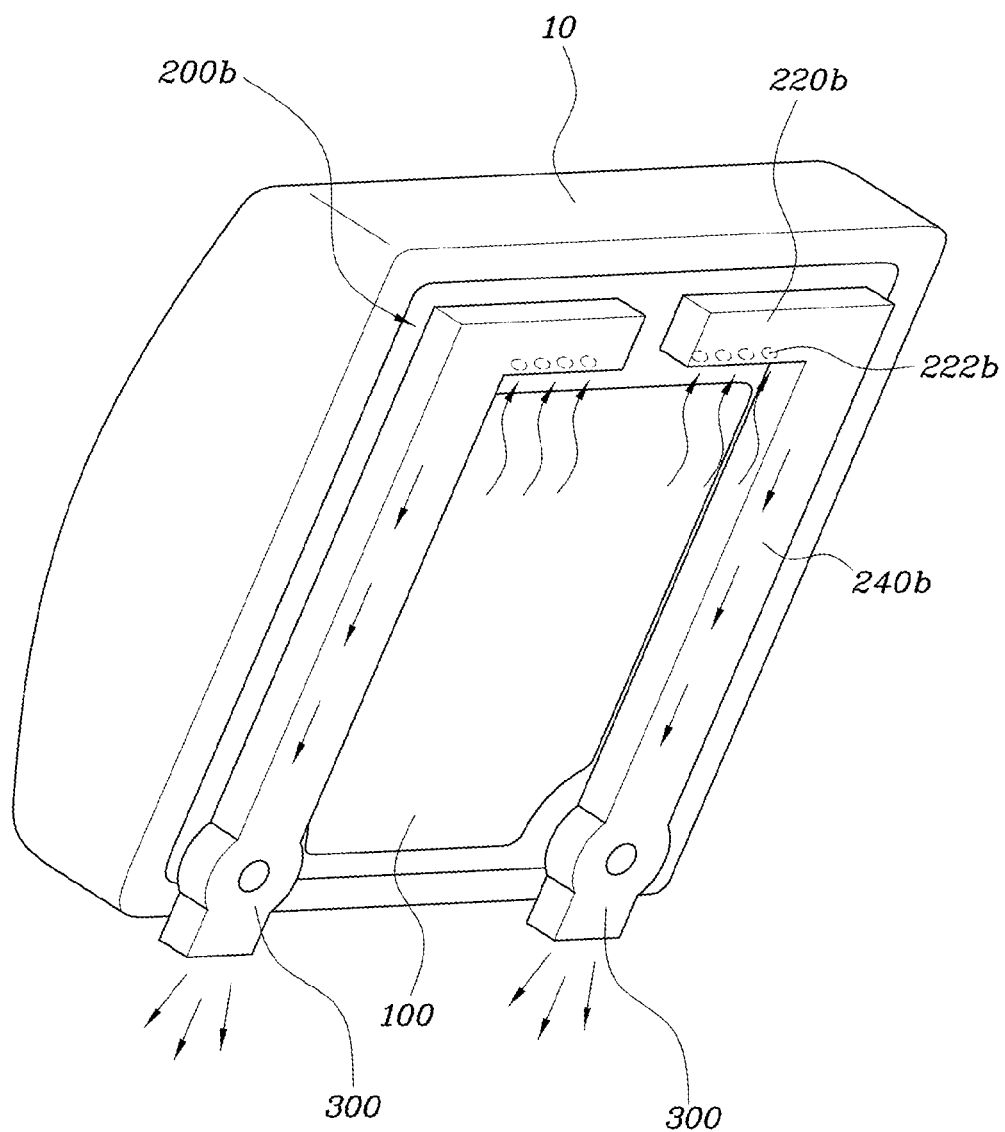

As a second embodiment, as shown in FIG. 4, a horizontal duct 220a of an air duct 200b may be symmetrically divided into two parts at the left and right sides from the center of the heating unit 100 and may have air intake holes 222b formed through the bottom, while a vertical ducts 240b are connected to the divided horizontal ducts 220b and disposed symmetrically at both sides of the heating unit 100. That is, the horizontal duct 220b is symmetrically divided at the left and right sides from the center of the heating unit 100 and disposed over the heating unit 100 and the vertical ducts 240b are connected to the divided horizontal duct 220b, so a plurality of blowing units 300 may be provided at the lower ends of the vertical ducts 240b.

That is, when the blowing units 300 are operated, high-temperature air flowing inside through the air intake holes 222b of the horizontal ducts 220b flows down through the vertical ducts 240b and is then discharged to the feet of the passenger P in the rear seat. Since the vertical ducts 240b are symmetrically disposed at both sides of the heating unit 100, the blowing units 300 at the lower ends of the vertical ducts 240b send the heated air to different areas, so the temperature of the air around the floor of the rear seat can be more quickly increased and the inside of the vehicle can be made more pleasant by circulation of the air.

Figure 5:
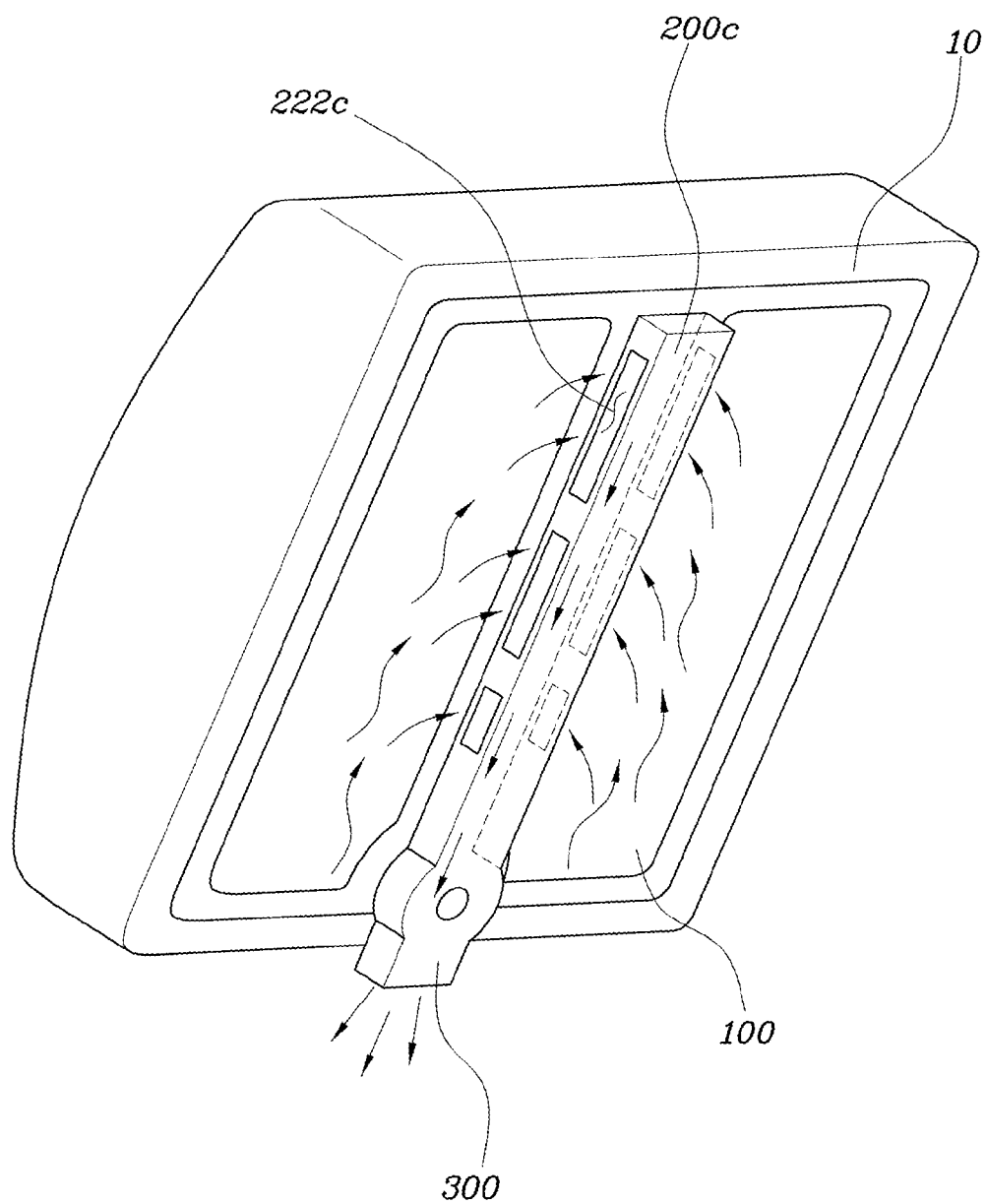

Further, as a third embodiment, as shown in FIG. 5, an air duct 200c may vertically extend across the center of the heating unit 100 and may have air intake holes 222c at both sides and a blowing unit 300 may be disposed at the lower end of the air duct 200c.

Since the air duct 200c is disposed across the center of the heating unit 100 and the air intake holes 222c are formed through both sides of the air duct 200c, air heated by the heating unit 100 can directly flow into the air duct 200c and can be discharged to the feet of the passenger P in the rear seat by the flowing unit 300. Further, since the air duct 200c extends vertically, the air intake holes 222c can be further elongated, so it is possible to ensure a sufficient amount of air to be supplied to the feet of the passenger P in the rear seat.

Figure 6:
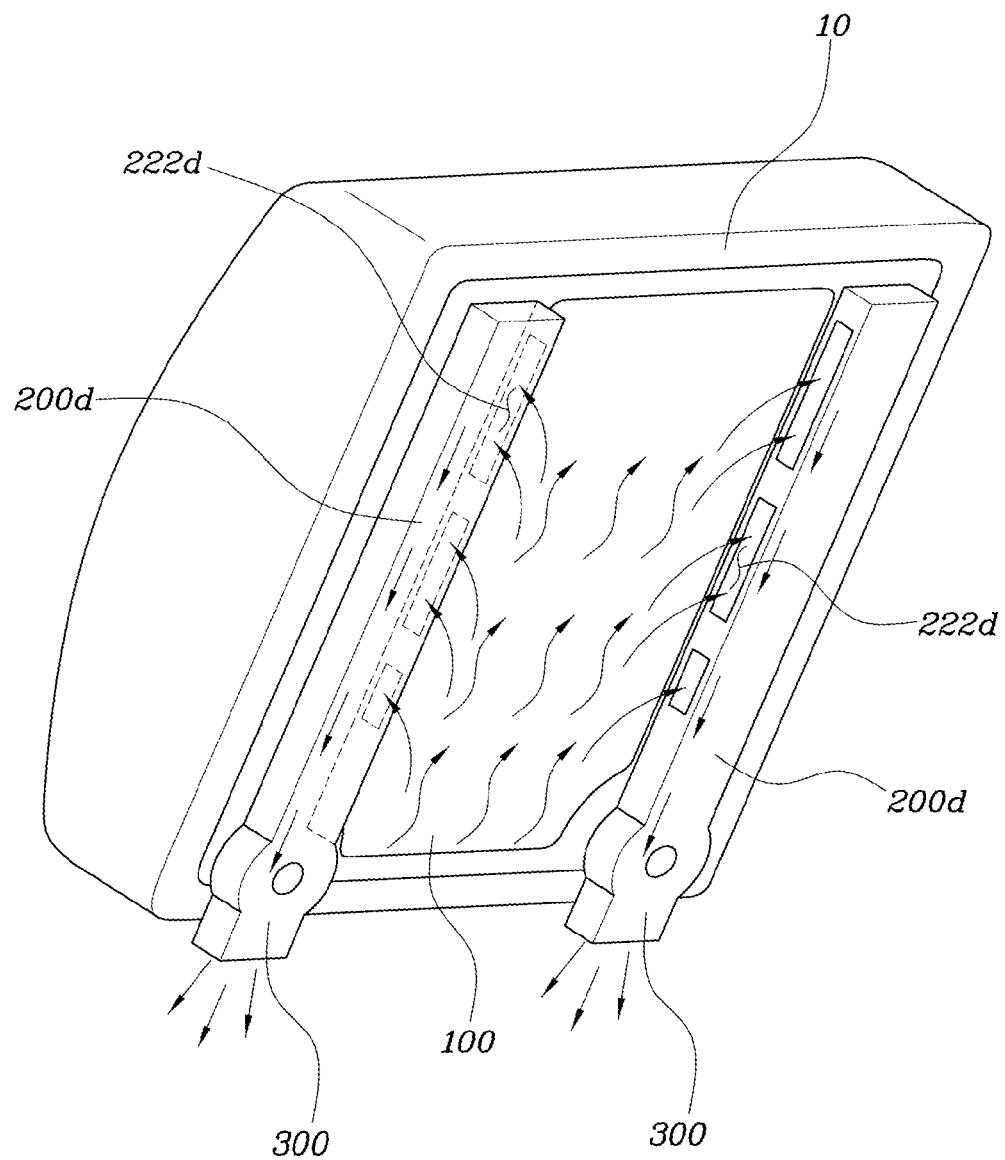

Further, as a fourth embodiment, as shown in FIG. 6, a plurality of air ducts 200d may extend vertically and symmetrically at both sides of the heating unit 100, air intake holes 222d may be formed at the sides facing each other of the air ducts 200d, and a blowing unit 300 may be disposed at the lower ends of the air ducts 200d.

That is, since the air ducts 200d are disposed symmetrically at both sides of the heating unit 100, a plurality of blowing units 400 can be provided at the lower ends of the air duct 200d. As described above, since the air ducts 200d extend vertically, the air intake holes 222d can be further elongated and a sufficient amount of air to be sucked can be ensured. Further, since the air ducts 200d are disposed at both sides of the heating unit 100, the blowing units 300 are disposed at different areas, so it is possible to more quickly supply heated air to the bottom under the rear seat.

Figure 7:
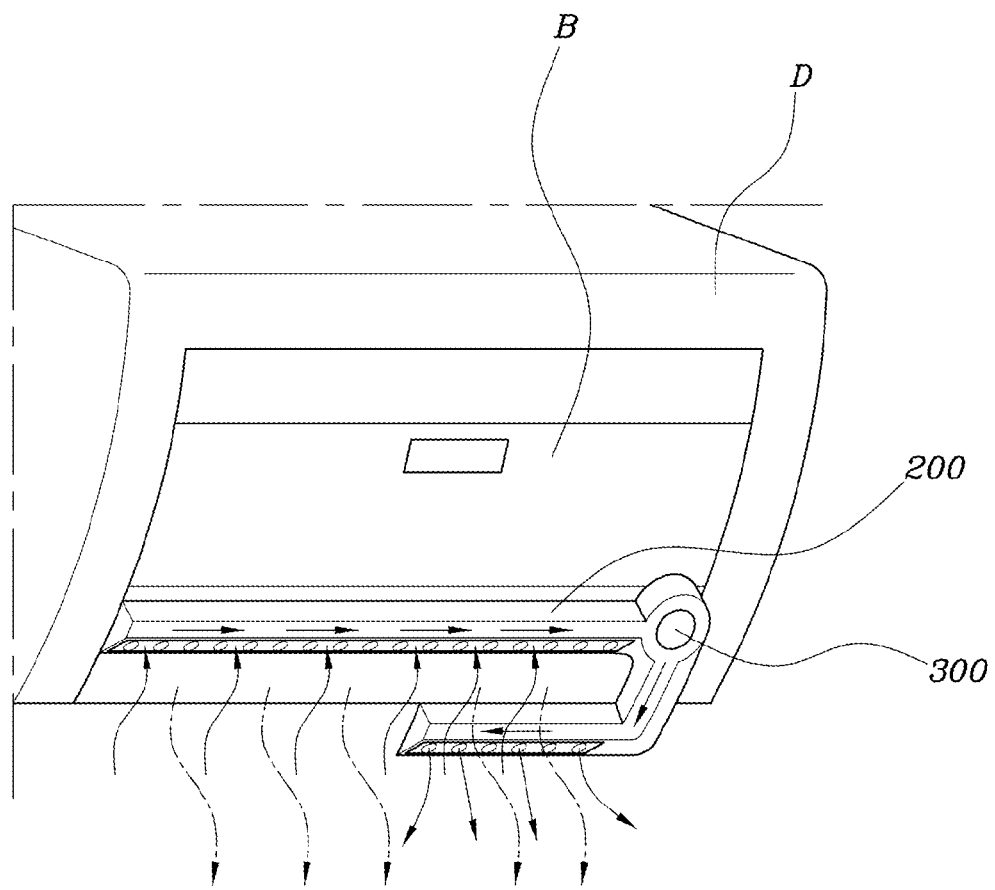

On the other hand, although the seat with a warmer is disposed on the front seat back 10 and supplies warm air to the passenger P in a rear seat in the embodiment, but, as shown in FIG. 7, the heating unit 100, air duct 200, and blowing unit 300 may be disposed on the dash panel ahead of the front seat back 10 and supply warm air to the passenger P in the driver seat.

That is, the heating unit 100, air duct 200, and blowing unit 300 are disposed at the lower portion of the glove box in the dash panel D so that heat radiated from the heating unit is supplied to a passenger while the air heated by the heating unit 100 flows into the air duct 200 and is then discharged to the floor by the blowing unit 300. Accordingly, the passenger can feel warmth throughout his/her body.

According to the seats with a warmer having the structures described above, heat is transmitted to the upper and lower body of a passenger P by the heat radiated from the heating unit 100 and the air heated by the heating unit 100 is also sent to the feet of the passenger P, so the passenger can feel warm throughout the body.

Therefore, a passenger in a vehicle can quickly feel warm in winter, and as warm air is supplied to the passenger's entire body, the passenger can more quickly feel comfortable.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat apparatus with a warmer, comprising:
   a heating unit mounted on a rear side of a seat back and radiating heat toward a rear seat;
   an air duct disposed close to the heating unit on the seat back, extending up and down on the seat back, and passing air therein; and
   a blowing unit disposed in the air duct generating a sucking force in the air duct so that air heated by the heating unit flows into the air duct, and sending out the heated air in the air duct to a floor under the rear seat,
   wherein a collector collecting the heat radiated from the heating unit is disposed on the seat back, and
   wherein the collector disposed on the seat back is configured to be fixed to a top of the heating unit, extending laterally as long as a width of the heating unit, protruding rearward and then bending down.

2. The seat apparatus of claim 1, wherein the heating unit is formed to have a predetermined area smaller than an area of the rear side of the seat back such that high-temperature heat is discharged through the predetermined area.

3. The seat apparatus of claim 2, wherein an insulator preventing heat from the heating unit from transferring to the seat back is disposed between the rear side of the seat back and the heating unit.

4. The seat apparatus of claim 1, wherein an isolating layer covering the heating unit to prevent direct contact with the heating unit is disposed on the rear side of the seat back.

5. The seat apparatus of claim 1, wherein the blowing unit is disposed at a lowest end of the air duct so that heated air flowing in the air duct is discharged to the floor under the rear seat.

* * * * *